(12) United States Patent
Rosenberg

(10) Patent No.: US 9,676,035 B2
(45) Date of Patent: Jun. 13, 2017

(54) PEELING DEVICE

(71) Applicant: Maik Rosenberg, Attendorn (DE)

(72) Inventor: Maik Rosenberg, Attendorn (DE)

(73) Assignee: aquatherm Besitzgesellschaft mbH & Co. KG, Attendorn (DE)

( * ) Notice: Subject to any disclaimer, the term of this patent is extended or adjusted under 35 U.S.C. 154(b) by 237 days.

(21) Appl. No.: 14/247,838

(22) Filed: Apr. 8, 2014

(65) Prior Publication Data
US 2014/0321933 A1   Oct. 30, 2014

(30) Foreign Application Priority Data

Apr. 24, 2013 (DE) .......................... 10 2013 104 153

(51) Int. Cl.
| | |
|---|---|
| *B23B 5/16* | (2006.01) |
| *B23B 5/12* | (2006.01) |
| *B26D 3/16* | (2006.01) |

(52) U.S. Cl.
CPC ............... *B23B 5/12* (2013.01); *B23B 5/168* (2013.01); *B26D 3/166* (2013.01); *B23B 5/16* (2013.01);
(Continued)

(58) Field of Classification Search
CPC ........... B23B 5/16; B23B 5/167; B23B 5/168; B23B 5/161; B23B 5/162; B23B 5/163; B23B 2215/72
(Continued)

(56) References Cited

U.S. PATENT DOCUMENTS 3,335,526 A * 8/1967 Weiss ...................... B23B 5/168
                                                                451/180
3,396,467 A * 8/1968 Scocozza ............... B23D 21/10
                                                                30/357

(Continued)

FOREIGN PATENT DOCUMENTS

| CN | 201482987 U | 5/2010 |
|---|---|---|
| CN | 201988782 U | 9/2011 |

(Continued)

OTHER PUBLICATIONS

Chinese Search Report dated Feb. 8, 2017 for Chinese Application No. 201410242110.9.

(Continued)

*Primary Examiner* — Daniel Howell
*Assistant Examiner* — Yasir Diab
(74) *Attorney, Agent, or Firm* — Ladas & Parry LLP

(57) ABSTRACT

The invention relates to a device (10) for the at least partial removal of the outside circumferential surface of a pipe consisting of plastic, comprising a hollow cylindrical housing (12), with a wall that surrounds a cylindrical interior space that accommodates the body in an axially moveable manner, at least one opening in the wall as well as a cutting element (74) that is associated with the opening (62) and with its cutting section projects into the interior space. To be able to remove the outside circumferential surface of the pipe in an unproblematic manner and to the desired degree, it is suggested that the cutting element (74) in a front view exhibit a disc or ring geometry and be connected to the housing (12) by a fastening element that extends in the direction of the longitudinal axis of the cutting element, whereby the cutting element can be connected to the housing in the desired position by rotating it about its longitudinal axis.

13 Claims, 3 Drawing Sheets

Figure 9:
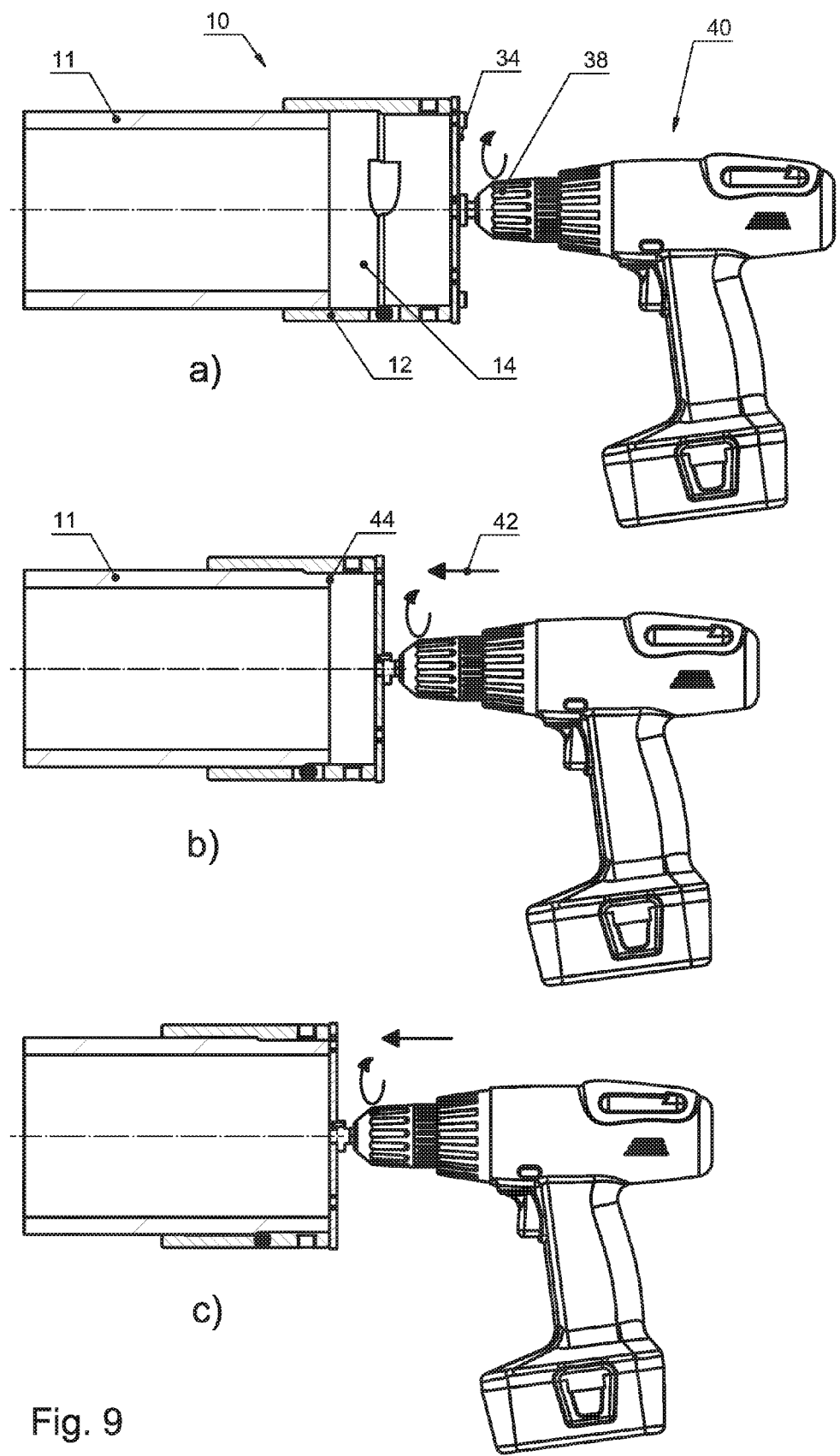

(52) U.S. Cl.
CPC ........... *B23B 5/167* (2013.01); *B23B 2215/72* (2013.01); *Y10T 408/893* (2015.01)

(58) Field of Classification Search
USPC ............................................ 82/113, 131, 128
See application file for complete search history.

(56) References Cited

U.S. PATENT DOCUMENTS

| | | | | |
|---|---|---|---|---|
| 3,636,803 | A * | 1/1972 | Miller | B23B 5/168 144/205 |
| 3,754,832 | A * | 8/1973 | Stickler | B23B 5/167 408/207 |
| 3,817,649 | A * | 6/1974 | Medney | B23B 5/168 144/205 |
| 4,691,600 | A | 9/1987 | Carlson et al. | |
| 4,958,542 | A * | 9/1990 | Skerrett | B23B 5/162 82/113 |
| 5,020,221 | A * | 6/1991 | Nelson | B23B 5/167 30/169 |
| 6,206,618 | B1 * | 3/2001 | Ramsey | B23B 5/168 408/201 |
| 6,993,848 | B2 * | 2/2006 | Snyder, Sr. | B23B 5/167 33/21.3 |
| 2005/0175421 | A1 | 8/2005 | Hall | |
| 2008/0075552 | A1 | 3/2008 | Legge | |

FOREIGN PATENT DOCUMENTS

| | | |
|---|---|---|
| DE | 3540665 A1 | 5/1987 |
| DE | 102519999 B4 | 5/2004 |
| DE | 102010047859 A1 | 4/2012 |
| JP | 2010094722 A | 4/2010 |

OTHER PUBLICATIONS espacenet English abstract of CN 201988782 U.
espacenet English abstract of CN 201482987 U.

* cited by examiner

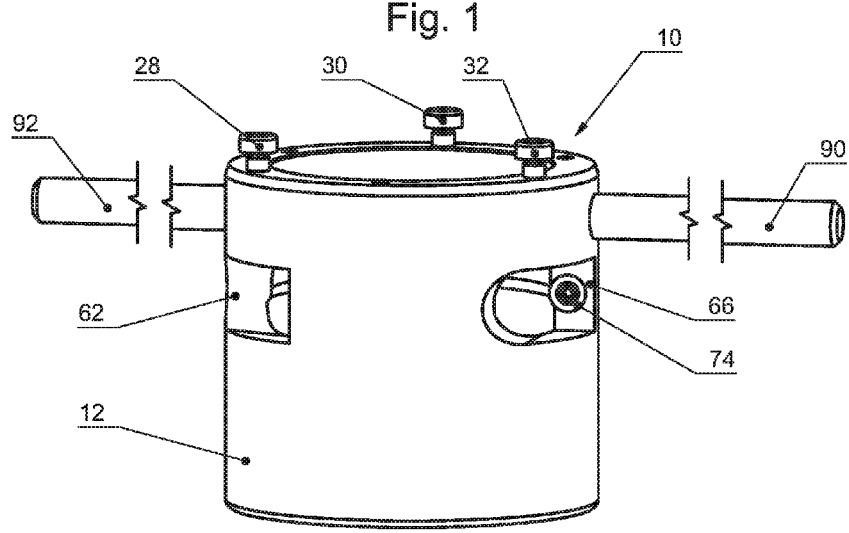
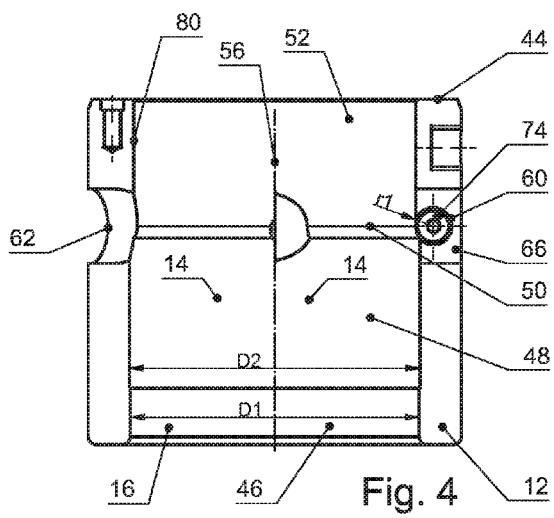
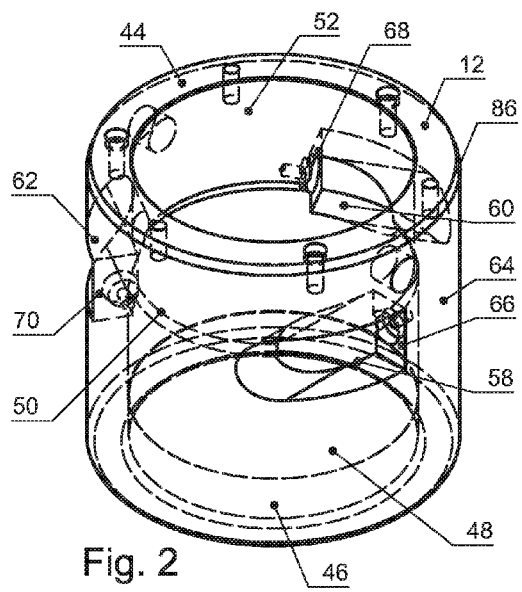
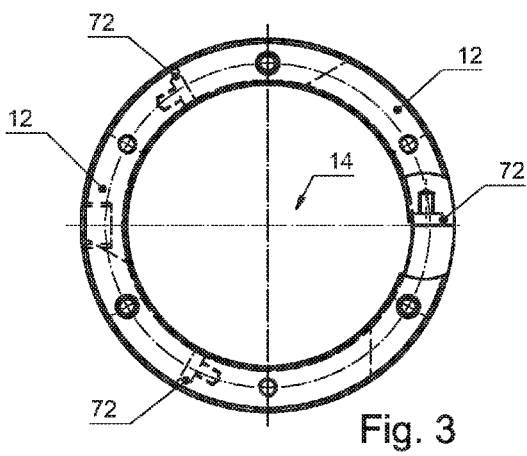

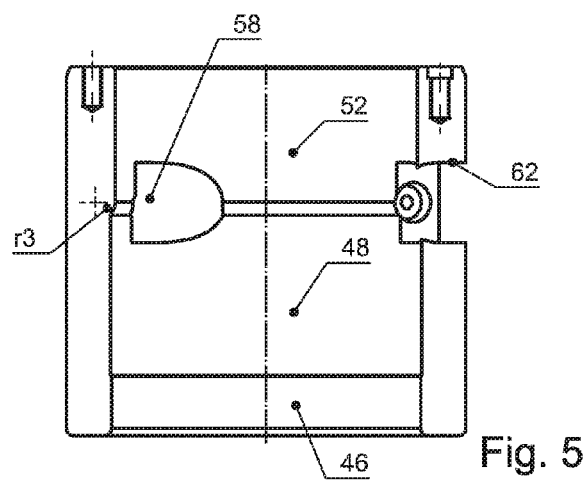
Fig. 5
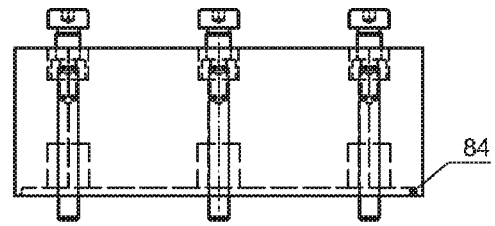
Fig. 6
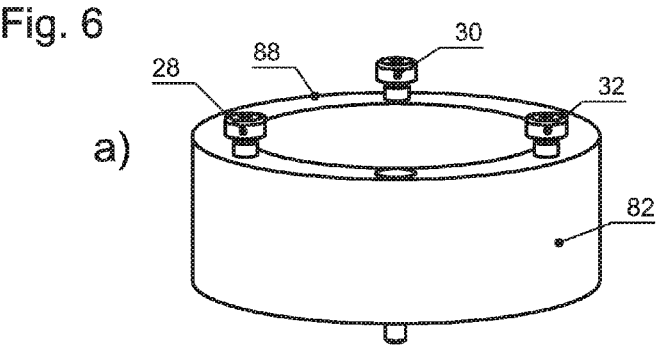
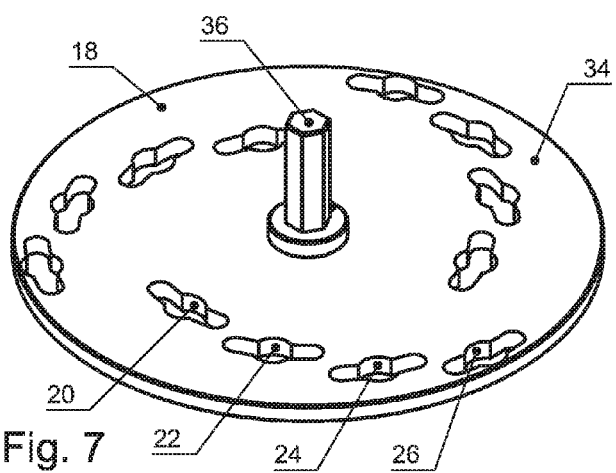
Fig. 7
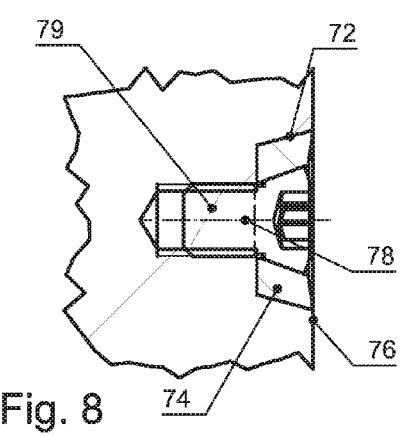
Fig. 8

PEELING DEVICE

This application claims priority to German Application No. 102013104153.1, filed Apr. 24, 2013, which is incorporated herein by reference.

The invention relates to a device for the at least partial removal of the outer circumferential surface of a cylindrical body, in particular a plastic pipe, comprising in particular a hollow cylindrical housing with a wall that surrounds a cylindrical interior space that accommodates the body in an axially moveable manner, at least one opening in the wall and one cutting element that is associated with the opening and extends into the interior space with its cutting section.

To be able to connect plastic pipes, for example, to a coupling sleeve or a fitting by bonding or gluing it is necessary to use a scraping process to remove the outer layer of the pipe surface. This is particularly crucial for bonded connections, in order to remove the oxide film generated by action of incident light.

Peeling devices known in the art possess a cylindrical housing, whereby in their circumferential wall one or several slits are present, which extend obliquely relative to the longitudinal axis of the housing and through which projects a peeling blade, a section of which projects into the interior space.

The height of this section determines the cutting depth. The shavings pass through the slits to the exterior. Once a peeling blade has become blunt, it will have to be replaced. Subsequently test peelings must be carried out to verify that the blades have been adjusted correctly. The inside diameter of the corresponding housings is equal to or slightly larger than the outside diameter of the pipes to be peeled, whereby the ovality of the pipe is transferred to the peeling result. To specify the length of the region to be peeled, a bolt may pass through the wall of the body and serve as a limit stop.

Peeling devices for cutting circumferential surfaces of rotationally symmetrical bodies are disclosed in for example DE 102 51 999 B4 or DE 10 2010 047 859 A1.

DE 10 2010 047 859 A1 relates to a peeling device that can be used to remove material from the surface of a pipe. Provided for this purpose is a drivable knife roll, from which project peeling blades. The peeling device is placed upon a pipe by means of guide elements that surround the knife roll laterally.

The subject matter of DE 35 40 665 A1 is a blade combination for peeling shafts in a shaft lathe with a rotating cutter head. The latter comprises a cutter bar, onto which is fastened a circular knife as well as a triangular knife. The circular knife is composed of blade inserts that are soldered onto a base body.

A peeling device with a cylindrical mounting support for accommodating a pipe is disclosed in JP-2010094772 A. The peeling device comprises a bracket, which extends along the longitudinal direction of the cylindrical space—and thus of the pipe—and from which projects a peeling element.

The objective of the present invention is to further develop a device of the above-mentioned type in a manner that allows an unproblematic removal of the outside circumferential surface of a cylindrical body to the desired degree, in particular of a plastic pipe, whereby after the section has become blunt, an unproblematic continuation of the cutting process should be possible without the need for complicated readjustments of the cutting element.

According to a further aspect of the invention, any ovality present in the cylindrical body to be peeled will not be transferred to the peeling result.

Yet another aspect of the invention relates to meeting the objective of employing uncomplicated measures to rotate the housing relative to the cylindrical body and to achieve a well defined peeling length.

Another aspect of the invention that is to be specially emphasized allows for a constant cutting depth during the peeling process.

To provide a solution for one or several of the above-mentioned problematic aspects, the invention fundamentally intends that the cutting element in a front view exhibits a disc or ring geometry and is connected to the housing via a fastening element extending along the longitudinal direction of the cutting element, whereby the cutting element can be connected to the housing in a desired position by rotating it about its longitudinal axis.

Divergent from designs known in the art, the cutting element that is employed here reveals a ring or disc shape in a top view so that whenever a peeling blade—or cutting section—has blunted, releasing the fastening element, rotating the cutting element, and subsequently tightening the fastening element will make available a new cutting section, which is then used for peeling.

Preferably the cutting element is embodied as a single piece and in particular as a rotationally symmetric body and possesses for example a hollow cone geometry, whose larger base area or edge of this base area serves as the blade. The cutting element is fastened by a fastening element, e.g. by means of a bolt, which extends along the cutting element's longitudinal axis, which coincides with the rotational axis, and is rotated about this axis, to make available a cutting or blade section that projects into the interior space of the housing.

To unambiguously fix the blade in position, it is provided that the opening is bordered by a receiver that accommodates the cutting element, such as a shallow depression or pocket, to which the circumferential side of the cutting element is fitted precisely. This allows fastening in a uniquely defined position. At the same time, this precisely specifies the depth of the cutting section that protrudes into the interior space.

The longitudinal axis of the opening in particular extends obliquely to the longitudinal axis of the housing and passes through the latter obliquely, i.e. quasi-tangentially. The opening may exhibit a hollow-cylinder or slot-shaped geometry. Preferably three openings are provided evenly spaced about a circle whose centre is situated on the housing's axis.

The cutter may consist of precision-sintered aluminium.

In an embodiment of the invention that is to be emphasized and has its own inventive merit it is intended that a section of the interior space extending upstream of the cutting element, as seen along the direction of movement of the body, possesses a diameter $D_2$ that is greater than the diameter of the interior space in the intake region, which has a diameter $D_1$.

As a result of the corresponding dimensioning, the intake region serves as a guide to the cylindrical body, whereby in the following region with a larger inside diameter the body can "release tension" and re-assume its original position, i.e. regain any ovality that may have been present. This ensures that an optimum roundness of the peeling result can be guaranteed during the subsequent cutting of the circumferential surface. For this it is in particular intended that a total of three cutting elements are distributed uniformly around the circumference of the housing with respective associated slit-like openings, through which the cuttings can be ejected during the peeling process.

In a further embodiment of the invention to be emphasized, a section that is referred to as a second section and possesses a diameter $D_2$, which merges into a third section, which in a sectional view towards the interior space forms a segment of a circle and whose circumference extends equidistantly to the circumference of the cutting element at least in the particular region, in which the cutting element cuts the circumferential surface of the cylindrical body, so that consequently the difference between the effective radius of the cutting element and the circle segment of the third section of the housing governs the cutting depth during the peeling. This allows the achieving of a constant cutting depth, which in turn guarantees a uniform surface structure of the cylindrical body such as a pipe.

In particular it is intended that the third section on its boundary on the interior-space side has a radius $r_3$ und the cutting element on its end face, which is equipped with the blade, has a radius $r_1$, whereby in particular $0.85\ r_1 \leq r_3 \leq 0.95\ r_1$.

The corresponding geometrical coordination is achieved by positioning the centre of the third section—which in a sectional view is a segment of a circle—and the centre of the cutting section on a circle, whose centre is located on the longitudinal axis of the housing.

As another feature with inventive merit it is intended that the housing is embodied as a hollow cylinder or possesses a hollow-cylinder geometry, that an opening on the front face acts as insertion opening for the cylindrical body, and that the opposing end opening or a detachable intermediate piece can be closed by a plate element, which on its exterior side possesses a pin-shaped projection, which extends along the longitudinal direction of the interior space and serves to facilitate loading into the drill chuck of a power drill. This allows a motor-driven operation of the device, whereby at the same time the plate element acts as a limit stop with respect to the cylindrical body, i.e. specifies the length of the region to be peeled.

To facilitate the usage of the plate element, also referred to as a driver plate, for housings of different inside diameters and consequently also in principle different outside diameters, it is intended that on several, such as four, concentric circles the plate element possesses openings for mounting the plate element on housings or intermediate pieces of different inside diameters.

It is also possible to embody the number of openings provided on concentric circles and the diameter of the driver plate in such a way that peeler housings for pipe diameters (in mm) of for example 20, 25, 32, 40, 50, 36 or 75, 90, 110, and 125 can each be connected to one driver plate. In other words, the driver plate is designed for several dimensions of pipes to be peeled, whereby the driver plate simultaneously acts as a depth limit stop for the length to be peeled. The driver plate may consist of stainless, hardened and tempered mould steel.

The use of an intermediate piece offers the possibility to extend the housing along the axial direction to achieve the desired peeling length.

To ensure an unambiguous alignment of the intermediate piece relative to the housing, it is intended that the intermediate piece on the edge of its end face on the housing side possesses a centering step such as a centering slope.

The housing and the intermediate piece may consist of aluminium.

To be able to also perform the peeling operation manually, it is further intended that from the housing, i.e. its circumferential surface, project two diametrically opposed and in particular bar-shaped handles.

Downstream of the cutting element, seen along the insertion direction of the body, the interior space has a diameter $D_4$, which is greater than the clearance between the longitudinal axis of the interior space and the cutting section. This ensures that during movement of the body into the first section no pressure is exerted onto the circumference of the body. In particular it is intended that the radius of the fourth section be approximately 0.05 to 0.15 mm larger than the effective clearance between the longitudinal axis of the interior space and the cutting section.

Further details, advantages, and features of the invention are not only found in the claims, the characteristic features listed therein—individually and/or in combination—, but also in the following description of embodiment examples illustrated in the figures.

The figures show:

FIG. 1 shows a perspective view of a peeling device according to the invention, FIG. 2 shows a further perspective view of the peeling device, FIG. 3 shows a cross-sectional view of the peeling device, FIG. 4 shows a section along the line H-H of FIG. 3, FIG. 5 shows a section along the line J-J of FIG. 3, FIG. 6a), b) show views of a housing extension, FIG. 7 shows a driver plate, FIG. 8 shows a detailed view of the peeling device in the region of a cutting element, and FIG. 9a)-c) show various illustrations of a peeling device with a pipe to be peeled.

The drawing, in which potentially identical elements carry the same reference labels, shows various illustrations of the invention's device 10, referred to as a peeling device, for the at least partial removal of the outside circumferential surface of a cylindrical body, in particular of a pipe 11 consisting entirely or partially of plastic. Suitable pipes include in particular oxygen-tight pipes, UV stabilized pipes, or pipes with for example a reinforcement layer of aluminium.

When pipes are to be joined, i.e. bonded to for example a fitting or a sleeve, it is necessary that the outside circumferential surface is peeled to a degree that facilitates a precisely fitted mounting in a corresponding connecting piece, so that a tight connection can subsequently be created using in particular bonding or gluing processes.

The invention's peeling device 10 possesses a housing 12 with a hollow-cylinder geometry and an interior space 14, which in a first front region possesses an intake opening 16, through which enters the pipe 11 to be peeled. The opposing opening of the housing 12 is closed by a so-called driver plate 18. On two concentric circles, this possesses longitudinal recesses 20, 22, 24, 26, through which can pass shoulder bolts 28, 30, 32 to connect the driver plate 18 to the housing 12. The configuration of the recesses 20, 22, 24, 26 and of the shoulder bolts 28, 30, 32 is depicted self-evidently in FIGS. 1 and 7 and is meant to illustrate that one and the same driver plate 18 can be placed upon and connected to peeler housings of different dimensions. These peeler housings of differing dimensions accordingly possess annular front face edges, the pattern of which corresponds to that of the longitudinal recesses 20; 22; 24; 26.

From the centre of the exterior side 34 of the driver plate 18 projects a hexagonal key shaped rod element 36, to enable the latter to be inserted into a drill chuck 38 of a power drill 40.

This provides the possibility of turning the peeling device 10, so that the pipe 11 can be peeled in accordance with the depictions of FIGS. 9a) to 9c). For this, the housing 12 is placed onto the pipe 11 in a manner so that the latter is guided into the interior space 14, where its circumferential surface will be peeled in the manner described in the following. For this, the peeling device 10 is moved along the axial direction of the pipe 11 in the direction of the arrow 42. The peeling process is complete when the device-side end face 44 of the pipe 11 comes into contact with the inner side of the driver plate 34, as is illustrated in FIG. 9c).

As illustrated in particular in FIGS. 2, 4, and 5, the interior space 14 of the housing 12 is subdivided into four sections, in particular one intake-side section 46 as a first section with a diameter $D_1$, one adjacent second section 48 with a diameter $D_2$ with $D_2 > D_1$, adjacent thereto a third section 50, and a fourth section 52 that extends to the front end 44.

While the inside surfaces of the first, second, and fourth sections extend in parallel to the longitudinal axis 56 of the housing 12 and consequently of the peeling device 10, the third section 50 possesses a cross section that extends convexly towards the interior of the housing, and in a cross-sectional view forms a segment of a circle with a radius $r_3$.

In the region of the third section 50 and partially both into the second and fourth sections 48, 52, extend slit-like openings 58, 60, 62, which extend from the housing's interior 14 to the exterior. The openings 58, 60, 62 pass through the wall 64 obliquely, i.e. not radially, but rather quasi-tangentially. In one of their respective end faces, the openings 58, 60, 62 possess borders 66, 68, 70, which are formed by the wall 64 of the housing 12, and in each of which is provided one pocket 72, also referred to as a shallow depression, for accommodating with a precise fit a single-piece cutting element 74, which possesses a hollow-cone geometry, as is illustrated in FIG. 8. Consequently, in a top view, the cutting element 74 exhibits an annular geometry, whereby the circumferential edge 76 acts as a cutting edge. The cutting element 74 is fixed in position in the pocket 72 by a bolt 78, whereby the bolt can be screwed into the wall 64. The cutting element 74 is arranged with respect to the third section 50—which towards the interior space 14 is bordered by a circular arc—in such a way that the outside surface of the section 50, i.e. the circular arc, extends equidistant to the cutting element's 74 edge that extends within the interior space 14, but has a smaller radius $r_3$, whereby the difference between the radii $r_3$, $r_1$ is between 0.05 mm and 0.15 mm, and $r_1$ is the radius of the circumferential edge 76 of the cutting element 74.

Put another way: the section of the cutting element 74 that facilitates the peeling, above the third section 50 projects preferably between 0.05 mm and 0.15 mm above the interior surface of the interior space 14. In order to ensure the geometric alignment of the third section 50 and the cutting element 74, it is intended that the centre of the third section 50, with a circle-segment cross-section, and the centre of the cutting section are situated on a circle, whose centre is situated on the longitudinal axis 56 of the housing 12.

The end face of the cutting element 76 extends in a plane of a longitudinal section of the housing 12, in which the longitudinal axis 56 is situated.

The effective circumferential length of the cutting section itself in particular is smaller than $r_1 \cdot \pi/2$. In addition, the arc length of the third section 50 should be smaller than $<r_3 \cdot \pi/2$.

As is shown in the drawn depictions of in particular FIGS. 4 and 5, the inside wall 80 of the fourth section 52 merges tangentially into the third section 50 and extends in parallel to the longitudinal axis 56 of the housing 12.

The diameter $D_1$ of the outermost or first section 46 is slightly smaller than that of the following second section 48 in order to provide the possibility that the pipe 11 penetrating via the opening into the first section 46 will be able to release tension in the second section 48, so that any ovality that may have been present originally can return. This serves to ensure that after the peeling process, which takes places in the region of the third section 50, an optimum roundness of the peeling result can be achieved. To this also contributes the even spacing of the three cutting elements 74 around the circumference, which are spaced with relative separations of 120°.

The inside diameter $D_4$ of the fourth section 52 is slightly greater than the peeling result, i.e. the effective diameter of the circle defined by the cutting elements 74. In this, the diameter $D_4$ is greater by about 0.1 mm to 0.3 mm. This serves to prevent any pressure being exerted on the pipe. However, irrespective thereof, the fourth section 52 serves as a guide for the pipe 11 while it is being advanced into the housing 12.

Once the section of the cutting element 74 that effects the peeling has become dull, it is only necessary to loosen the bolt 78 in order to rotate the cutting element 74 within the pocket 72 by the required degree and to subsequently retighten the bolt 78. Since the cutting element 74 is arranged with a precise fit within the pocket 72, it will be ensured even after the cutting element 74 has been rotated that the desired peeling result can be obtained.

To be able to peel different lengths of the pipe 11, if so desired, a hollow cylindrical extension piece 82 can be attached to the front end 44 of the housing 12. For centering purposes the intermediate piece on its housing-side end region possesses a step 84 serving as a centering slope and the end region of the housing 12 exhibits a geometrically matched shoulder 86. The connection preferably is established via hexagon-socket screws, which does not have to be explained in more detail.

For attaching the intermediate piece 82 to the driver plate 34, shoulder bolts 28, 30, 32 originate from the front edge 88 of the intermediate piece 82 in the above-described manner, and pass through the slits 20; 22; 24; 26 of the driver plate 34 that are arranged on concentric circles, so that they can be fixed in position by rotating the driver plate 34, since the heads of the shoulder bolts 28, 30, 32 will then rest—laterally to the slits 20, 22, 24, 26—on the outside of the outer surface 34 of the driver plate 18. Intermediate pieces 82 of such a type are employed in particular when the pipes are being prepared for bonding, to provide a sufficient length of peeled outer circumferential surface.

However, the peeling device 10 is not exclusively motor-driven, but can also be operated by hand, as is illustrated in FIG. 1. In particular, from the outer surface of the housing 12 may project two diametrically opposed bar-shaped handles 90, 92, which are referred to as knobs and which serve as means to rotate the housing 12 relative to a pipe. Additionally or alternatively it is also possible that the circumferential surface of the housing is structured, e.g. provided with a knurled pattern, so that hand slippage can be prevented when the housing is turned manually.

In particular during manual operation it is possible to peel a body such as a pipe over any desired length, since the driver plate 34 is no longer needed in this case.

The peeling device according to the invention in particular offers the advantage that the ovality of the peeled body such as a pipe is minimized by the undercut in the front guide cylinder.

The particular arrangement of the three rotationally symmetric inner sections 46, 48, 52 in combination with the constant in-feed as a result of the cutting depth ensures excellent dimensional accuracy, excellent quality of surface finish, as well as a concentric peeling result.

The invention claimed is:

1. A device for at least a partial removal of an outer circumferential surface of a cylindrical body, the device comprising:
   a cylindrical housing having a longitudinal axis, an outer peripheral wall, and an inner peripheral wall defining an interior space;
   wherein the interior space is configured to accommodate the cylindrical body in an axially movable manner;
   an opening extending from the outer peripheral wall to the inner peripheral wall;
   a cutting element arranged in the opening;
   wherein a cutting section of the cutting element projects into the interior space;
   wherein the cutting element is disc- or ring-shaped;
   a fastening element connecting the cutting element to the housing;
   wherein the fastening element extends along a direction of a longitudinal axis of the cutting element;
   wherein the cutting element is fastened to the housing by rotation of the cutting element about a longitudinal axis of the cutting element;
   wherein, extending in a direction of movement of the cylindrical body, upstream of the cutting element, a first section of the interior space has an inside diameter D2;
   wherein the first section merges into a second section of the interior space;
   wherein a boundary of the second section, towards the interior space, has a circular-segment cross section; and
   wherein the second section has a circumference extending equidistant to a circumference of the cutting element, at least in a region of the cutting section.

2. The device according to claim 1,
   wherein the cutting element is constructed as a single part and is rotationally symmetrical;
   wherein the cutting element has a hollow cone geometry with a circumferential base area; and
   wherein the base area, or an edge of the base area, acts as a cutting edge.

3. The device according to claim 1,
   wherein the cutting element is precisely and fittingly received in a seat formed in a border of the opening.

4. The device according to claim 1,
   wherein three slotted openings are uniformly and circumferentially arranged around the housing
   wherein the slotted openings have a hollow cylindrical or slot-like geometry; and
   wherein longitudinal axes of the slotted openings extend obliquely or perpendicular relative to the longitudinal axis of the housing.

5. The device according to claim 1,
   further comprising a third section of the housing, wherein, on a side of the housing that receives the cylindrical body, the third section has a diameter D1 that is smaller than a diameter D2 of the first section of the housing, adjacent to the third section.

6. The device according to claim 1,
   wherein a fourth section of the interior space, extending downstream of the cutting element as seen along a direction of movement of the cylindrical body, has a diameter D4;
   wherein D4/2 is greater than a clearance between the longitudinal axis of the housing and the cutting section.

7. The device according to claim 1,
   wherein a center of the second section and a center of the cutting section are situated on a circle; and
   wherein a center of the circle is located on the longitudinal axis of the housing.

8. The device according to claim 1, further comprising a plate element disposed on and closing an end surface region of the tubular body opposite an intake opening for the cylindrical body.

9. The device according to claim 8,
   wherein a detachable intermediate piece is disposed between the plate element and the tubular body.

10. The device according to claim 8, wherein the plate element comprises a key-shaped projection to facilitate loading into a chuck of a drill.

11. The device according to claim 8, wherein the plate element comprises openings arranged on concentric circles to facilitate fastening the plate element to housings or intermediate pieces of different dimensions.

12. The device according to claim 9, wherein the intermediate piece comprises a centering step in a region of the intermediate piece that rests against the housing.

13. The device according to claim 1, wherein two rod-shaped handles extend from an outer surface of the housing.

* * * * *